(12) United States Patent
Gansner et al.

(10) Patent No.: US 7,454,439 B1
(45) Date of Patent: Nov. 18, 2008

(54) SYSTEM AND METHOD FOR LARGE-SCALE DATA VISUALIZATION

(75) Inventors: Emden Gansner, Morristown, NJ (US); Eleftherios Koutsofios, Chatham, NJ (US); Stephen Charles North, Lebanon, NJ (US); Russell N. Truscott, Bethlehem, PA (US)

(73) Assignee: AT&T Corp., New York, NY (US)

( * ) Notice: Subject to any disclaimer, the term of this patent is extended or adjusted under 35 U.S.C. 154(b) by 1087 days.

(21) Appl. No.: 09/721,884

(22) Filed: Nov. 24, 2000

Related U.S. Application Data

(60) Provisional application No. 60/167,349, filed on Nov. 24, 1999.

(51) Int. Cl.
  *G06F 7/00* (2006.01)
(52) U.S. Cl. .................................. 707/104.1; 715/264
(58) Field of Classification Search ................ 707/3–5, 707/104.1, 1; 705/37; 345/419; 709/245; 455/406
  See application file for complete search history.

(56) References Cited

U.S. PATENT DOCUMENTS

| | | | | |
|---|---|---|---|---|
| 5,548,694 A | * | 8/1996 | Frisken Gibson | 345/424 |
| 5,715,334 A | * | 2/1998 | Peters | 382/254 |
| 5,995,990 A | * | 11/1999 | Henry | 708/402 |
| 6,052,648 A | * | 4/2000 | Burfeind et al. | 702/3 |
| 6,154,728 A | * | 11/2000 | Sattar et al. | 705/28 |
| 6,473,080 B1 | * | 10/2002 | Brown et al. | 345/419 |
| 6,526,426 B1 | * | 2/2003 | Lakritz | 715/536 |
| 6,813,645 B1 | * | 11/2004 | Meyer | 709/245 |
| 6,904,276 B1 | * | 6/2005 | Freeman et al. | 455/406 |

\* cited by examiner

*Primary Examiner*—Sathyanarayan Pannala
(74) *Attorney, Agent, or Firm*—Henry Brendzel

(57) ABSTRACT

The present invention is directed to a new visualization platform for the interactive exploration of large datasets. The present invention integrates a collection of relevant visualization techniques to provide a new visual metaphor for viewing large datasets. It is capable of providing comprehensive support for data exploration, integrating large-scale data visualization with querying, browsing, and statistical evaluation. A variety of techniques are utilized to minimize processing delays and the use of system resources, including processing pipelines, direct IO, memory mapping, and dynamic linking of "on-the-fly" generated code.

9 Claims, 7 Drawing Sheets

SYSTEM AND METHOD FOR LARGE-SCALE DATA VISUALIZATION

CROSS REFERENCE TO RELATED APPLICATIONS

This application claims priority to Provisional Application Ser. No. 60/167,349, filed on Nov. 24, 1999, the content of which is incorporated by reference herein.

FIELD OF THE INVENTION

The present invention relates generally to data visualization and, more particularly, to the use of data visualization for analyzing large-scale data sets.

BACKGROUND OF THE INVENTION

Many data analysis tasks that are tractable on small or medium-sized data sets can be difficult at greater scale. When practitioners refer to terabyte databases, they sometimes mean databases of image, sound or video data. In contrast, the present invention is enables a user to work with many small records describing transactions, network status events, etc. The data processing involved is different in terms of the number of records and data items to be interpreted. For example, with regard to modern voice communication networks, information is stored for each of the hundreds of millions of calls made daily. Understanding the relationships between them is increasingly important, e.g. to manage integrated communication services for global enterprises, but the data management problems that result are even more challenging than for a single service.

More than just scale is involved: it is desirable to raise the level of abstraction in large-scale data visualization, and to improve the real-time response of the analyses. This can help network managers and business decision makers to recognize and respond to changing conditions quickly; within minutes when possible. It is desirable to provide good interactive response, avoid instance-specific processing, and be flexible enough to support experiments in both back-end queries and the user interface. The inventors have found that commercial database systems either couldn't handle such large volumes or consumed far too many resources.

SUMMARY OF THE INVENTION

The present invention is directed to a new visualization platform for the interactive exploration of large datasets. The present invention integrates a collection of relevant visualization techniques to provide a new visual metaphor for viewing large datasets. It is capable of providing comprehensive support for data exploration, integrating large-scale data visualization with querying, browsing, and statistical evaluation. A variety of techniques are utilized to minimize processing delays and the use of system resources, including processing pipelines, direct IO, memory mapping, and dynamic linking of "on-the-fly" generated code. Unlike prior art formal databases which focus on a query/response methodology, an embodiment of the present invention uses an approach that emphasizes data streaming.

These and other advantages of the invention will be apparent to those of ordinary skill in the art by reference to the following detailed description and the accompanying drawings.

DETAILED DESCRIPTION

Figure 1:
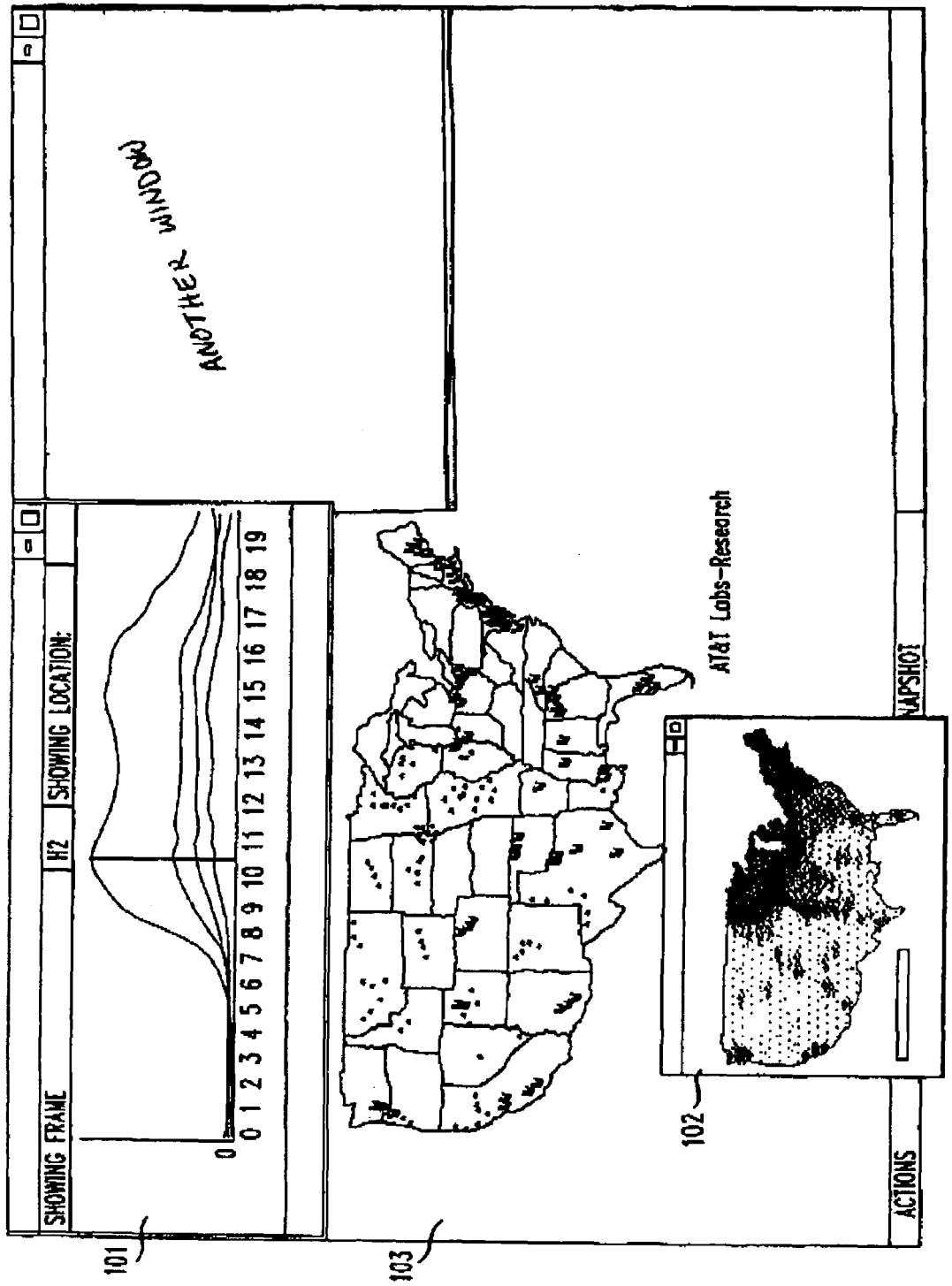
FIG. 1 is a screenshot of a network data visualization display, illustrating an embodiment of the present invention.

FIG. 1 sets forth an exemplary screenshot of the visualization interface for a large-scale dataset visualization system, which the inventors have called SWIFT-3D. The visualization component of SWIFT-3D can map the data to a set of linked 2D and 3D views created by different visualization techniques: (a) statistical 2D visualizations (e.g., line graphs, histograms, etc.) used as an overview display and for interactive data selection; (b) pixel oriented 2D visualizations, intended as a bird's eye overview and for navigation in 3D displays; and (c) dynamic 3D visualizations, used for an interactive detailed viewing of the data from different perspectives. The display is preferably physically large. For example, the inventors have utilized SWIFT-3D with a display wall 6 feet by 15 feet in size and driven by 8 LCD projectors connected through a software video switch receiving the output of two graphic pipes of an SGI Onyx. Nevertheless, the inventors have also utilized SWIFT-3D on smaller screens, such as those typically used on a desktop computer.

FIG. 1 illustrates this in the context of visualization of real-time voice network volume. The upper left window 101 in FIG. 1 shows a statistical 2D visualization in the form of a time line visualization of network volume in 10-minute intervals. The plot shows voice network volume for different services (e.g. residential, business, 1+ dial-around service, software-defined networks, and aggregate volume). The window below the time line allows the user to select data for display by date, time or type of service. The large window 103 in FIG. 1 shows a three-dimensional display of the data using a histogram spike for each location to display a value (typically a level of activity) corresponding to the cursor position in the time line window (shown in FIG. 1 as selecting the time 11:00). The user can interactively navigate in the 3D display, zoom in at interesting locations, or view the map from arbitrary perspectives. An automated path-planning module can be utilized to determine a natural, context-preserving path from one viewpoint to another. The small window 102 in the lower left corner in FIG. 1 provides a 2D overview showing call volume for each location by one colored pixel. It is advantageous to utilize a 2D visualization algorithm like Gridfit. See Daniel A. Keim and Annemarie Herrmann, "The Gridfit Algorithm: An Efficient and Effective Algorithm for Visualizing Large Amounts of Spatial Data," Proc. IEEE Visualization, p. 181-88 (1998).

Other windows are also possible, as outlined, for example, in FIG. 1.

Figure 2:
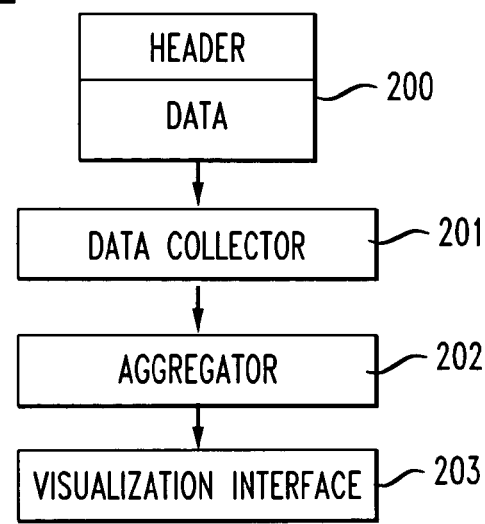
FIG. 2 is an abstract diagram of a data visualization architecture, in accordance with an embodiment of the present invention.

FIG. 2 sets forth an implementation architecture for SWIFT-3D. It consists of three modules: data collector 201, aggregator 202, and visualization interface 203. The modules communicate using self-describing data-independent binary formats 200 consisting of a header that defines record size, type and data context, followed by the actual data. This is advantageous since SWIFT-3D is designed to work in real-time. The data processing modules can work incrementally and the visualization tools can safely access the data files while they are being updated. This, of course, in a preferred embodiment necessitates high-performance storage depending on the size of the data files. For example, for the voice network data described below which can reach sizes of 15 Gbytes of data uncompressed per day, the inventors have found it advantageous to use an 800-megabit High Performance Parallel Interface (HPPI) network providing 10 terabytes of on-line storage and another 20 terabytes of tape under hierarchical storage management.

A. Data Collection and Storage

The data that is utilized in the system may be collected from many different sources having their own specialized formats. Such data must be converted to the internal self-describing format. When that data is already in a fixed format, all that is need is to associate a data record schema with the file. The schema can be either in the header of the file, as described above, or can be placed in a separate schema file. SWIFT-3D utilizes a schema file with the following sections:

name name field name [unsigned] (char|short |int|long|float|double) size

The inventors utilize C programming conventions, such as the data types, in the examples herein. For example, the following is a representative schema for a node in a frame relay network:

name node
field node_name_id int 1
field node_id short 1
field platform char 1
field subtype char 1
field release char 10
field alarm_state char 1

The schema has six fields, each field representing different information about the node.

Standard data processing tools suffice for such data conversion, but it should be noted that some types of data may need more intricate pre-processing. For example, in voice networks, the detail record for each call conforms to an industry standard format called Automatic Message Accounting (or AMA) that has about 50 attributes such as originating and terminating phone numbers, date, time and duration of the call. The AMA format has many sub-record types that can be combined to describe a call. Extracting information from AMA files is further complicated because, depending on the type of call, a value can be stored in different sub-records. For example, the dialed number is kept in different places in domestic and international calls. Such idiosyncratic processing should be performed by custom tools to load into the self-describing format utilized in the context of the above system.

For reading records off disks, SWIFT-3D advantageously uses Direct-IO if available. Direct-IO, as is understood in the art, bypasses kernel buffer copying from disk, and can be twice as fast as normal IO. Normal IO can be faster for data that was recently read and is still in cache, but this is the rarely the case given large datasets.

B. Data Processing

Initial processing of a data feed usually involves reading in records and computing basic statistics. SWIFT-3D advantageously includes libraries of different tools permitting sophisticated processing of the data. Tools are provided to filter records (e.g., remove call records that did not complete), count based on attributes (e.g., count number of incomplete calls by area code and exchange), and split a single file into several based again on some combination of attributes (e.g., separate calls into a file per type of service such as toll free calls, operator calls, collect calls, etc.). The inventors have found it convenient to group the toolkits into tools that operate on record-based files and tools that operate on aggregate files. The inventors refer to the toolkits respectively as "DDS" (Dynamic Data Schema Library) and "AGGR" (Aggregation Toolkit).

Figure 3:
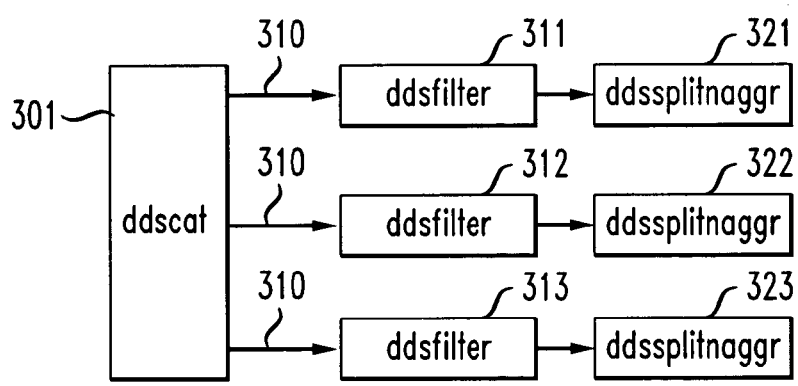
FIG. 3 is an illustration of processing pipelines.

SWIFT-3D advantageously relies on a stream pipeline model. Accessing large-scale data on disk can be expensive. Instead of storing the output of each processing step to disk, stream processors may be implemented as concurrent processes that exchange data. SWIFT-3D extends the traditional UNIX pipe model of a single writer and single reader to that of a single writer and many readers to minimize data copying. For example, FIG. 3 sets forth a variety of DDS tools advantageously combined using the stream pipeline model. ddscat 301 reads data from disk and feeds three other processes, 311, 312, 313, through stream pipelines 310 (ddscat, like the analogous UNIX command cat, is capable of concatenating files or merely copying from standard input to standard output). ddsfilter 311, 312, 313 reads records from the pipelines 310 and uses a supplied expression to decide whether to keep or drop each record from the output. ddssplitnaggr 321, 322, 323 read records output by ddsfilter and generate aggregate-style output containing counts based on the supplied expression, per unique combination of the supplied fields.

The user, for example, may use such filtering/splitting/counting capabilities to process a day's worth of telephony data and compute how many calls there were per area code and exchange (NPA, NXX) divided by separate filters into toll-free calls, business calls, residential calls, etc. The user may want to filter out complete calls from incomplete calls and compute separate counts for each. The user may want to split the calls into a count for each originating NPA/NXX and for each terminating NPA/NXX—or count minutes instead of calls. The expressions used for filtering, counting, or splitting advantageously can be specified in a C-style expression. For example, the expression:

if (tos == TOLLFREE && iscomplete) KEEP; else DROP;

filters out calls that are not toll free (1-800, 1-888, 1-877) or not complete. These expressions advantageously can be turned into code that is compiled into shared objects "on the fly" and are then dynamically linked in and executed. This approach combines the speed of compiled code like C with the flexibility of tools such as AWK.

The format for the aggregate files is advantageously self-describing and can be specified as follows. Each aggregate file in SWIFT-3D has two sections: a dictionary section and a data section. The data section can be a two dimensional array of values (integers, floats, etc.). One dimension corresponds to what the inventors refer to as a "frame" (typically a time bucket) and the other corresponds to an aggregation type which the inventors call an "item." The dictionary can be used to map item identifiers to item positions in the second dimension. For example, the aggregation file could contain the number of phone calls in a day by time of day and by NPA/NXX. Each frame would contain information about a ten minute interval; each item would contain the count of calls for one area code and exchange (for the 10 minute interval). The dictionary section would provide the ability to associate a particular area code and exchange (e.g. 973-360) to a particular item (say position 12345). The files can be designed to be accessed and changed incrementally: when new data arrives, these files are opened and the various counts are increased in place (using some buffering to minimize accesses to the files). It is advantageous to do the actual updating of the files using memory mapping, due to the random access nature of the updating. File locking can be used to protect against accessing such a file in the middle of an update. Each update can increment a count stored in the file. This allows the visualization tools to efficiently check if the file has been modified.

C. Data Visualization

Figure 4:
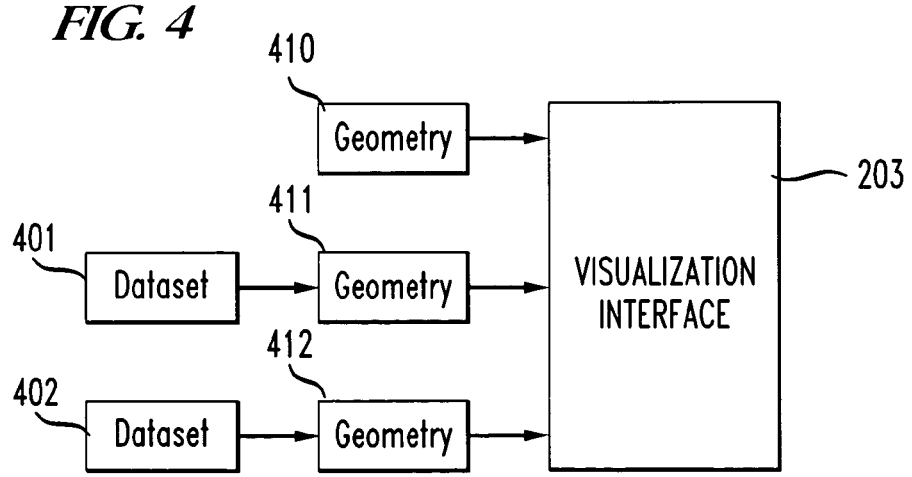
FIG. 4 is an illustration of a plurality of datasets being input to the visualization interface.

The visualization interface 203 allows users to explore data filtered by the stream processors. As represented abstractly in FIG. 4, a link to visual objects is implemented by generating geometric datasets that contain information about the items they represent. The mapping between the data, e.g. 401, 402, and display objects in the visualization interface 203 is set in these auxiliary files, e.g. 410, 411, 412, that contains geometric information about points, lines, polygons, and triangles, and coloring. For example, an NPA/NXX may be represented by a point, bar, or polygon of its geographical area. In all cases, the geometry file contains information to link the NPA/NXX to the point, line, or polygon. Besides answering user queries, this facility can also be used to alter the geometry based on data values. For example, if NPA/NXXs are shown as polygons and busy NPA/NXXs need to be colored red, the system uses this mapping to determine red polygons. Various color maps may be defined to highlight interesting properties of data.

Figure 5:
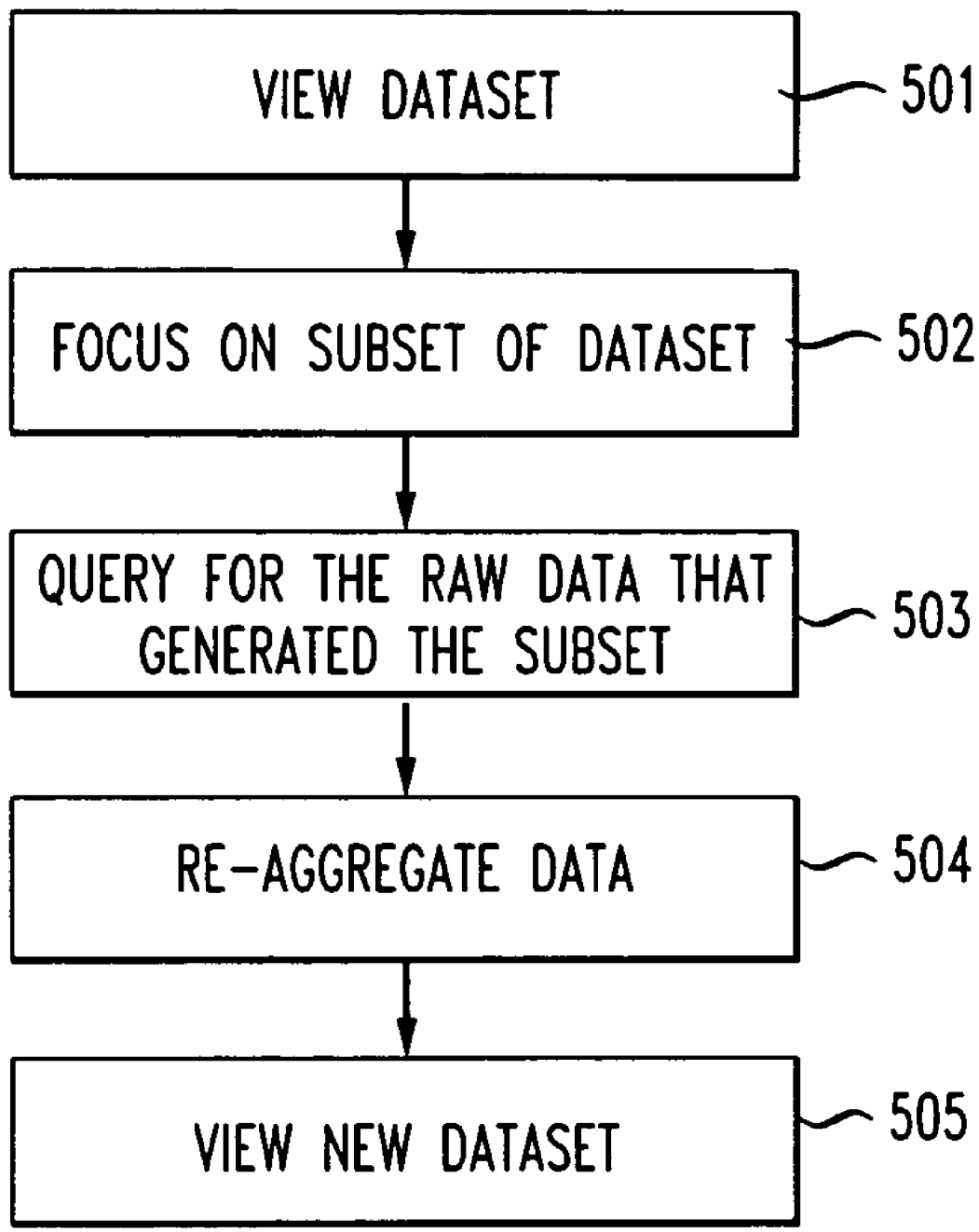
FIG. 5 is a flowchart illustrating visualization interactivity in accordance with an embodiment of the present invention.
Figure 6:
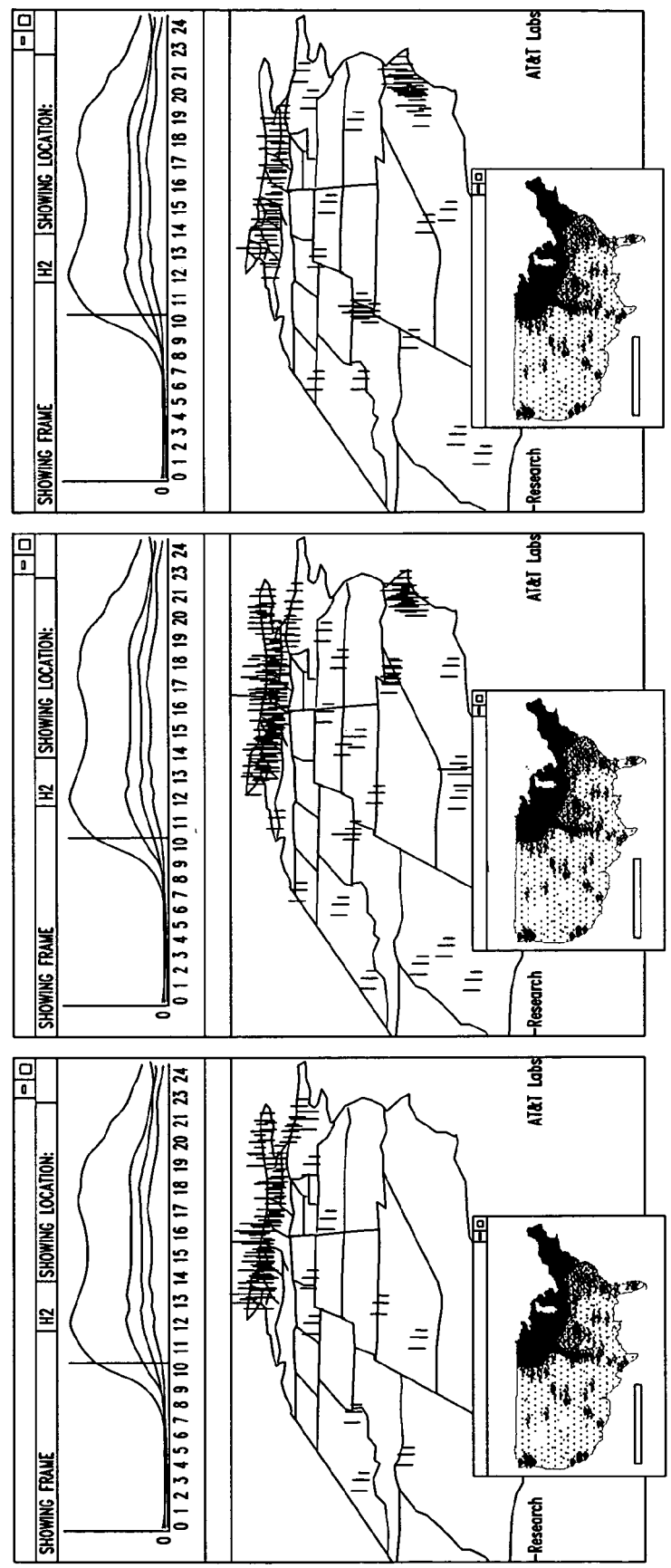
FIG. 6 is a screenshot illustrating a network traffic time-series, displaying fluctuations in network usage over time.

By keeping enough information to link the raw data, aggregate data and visual objects, the system enables the visualization tools to be highly interactive. The combined interface of data analysis and visual metaphors permit the user to engage in a dialogue with the data through the visual metaphor. As the flow chart in FIG. 5 illustrates, a user can view some dataset (501), focus on a specific subset (502), query the system for the raw data that generated this subset (503), re-aggregate (504), and view the new result (505). The system provides tightly integrated browsing and querying tools to select the data to be displayed and to "drill" down for details if some interesting pattern has been found. The mapping file may advantageously contain multiple levels of detail: for example, a dataset representing the United States may be divided according to state, county, and telephone exchange, census block and 9-digit postal zip code outlines. Also, multiple data value sets can be mapped to the same geometry. For example, state population can be mapped to the state outline level and county population to the county level. As the view of a state enlarges, the displays can shift from showing a single value for state population to showing one per county. The user may also play through an adjustable interval in the time line window to get an animated time-sequence display. If the user sees an interesting pattern in the visualization window, a drag-and-drop interface is available to drill down to get details, explore context and take actions if necessary. This provides an intuitive way of converting spatial information into detailed information such as the top originating or top dialed numbers.

D. Applications

SWIFT-3D can be applied to many different problems, particularly with regard to network visualization. These include the ability to provide an abstraction that permits visualization of the data across the information strata of network element, network, services and customers; the ability to view cross network interactions and their impact upon a service and/or customer; the capabilities to discern impact on one or more customers when there is a network event.

Figure 7:
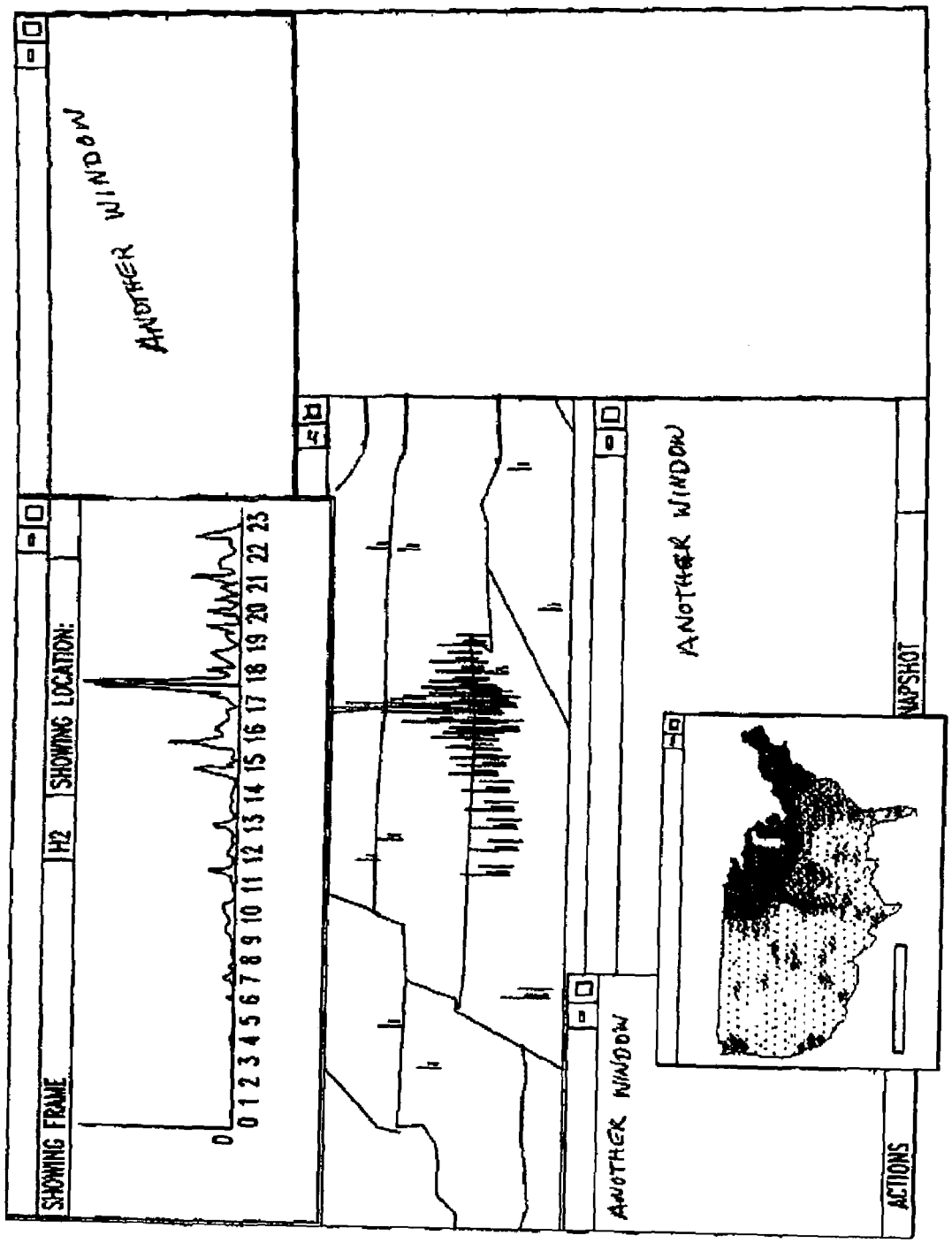
FIG. 7 is a screenshot illustrating inspection of a network event's impact on a geographic location.

An interesting example is the examination of calls that cannot be completed due to congestion at the customer premise. Keeping this number low is important due to the resources consumed. It is important both to the customers (who need reliable service for telemarketing sales and customer support) and to the network service provider from a financial standpoint (because unanswered calls consume network resources and may incur cross-carrier settlement charges without creating revenue). In visually exploring voice network events, the inventors noticed that on several days within an interval of several weeks, many unanswered calls originated in a certain metropolitan area (cf. FIG. 7). The events always occurred at bottom of the hour (:30) for several hours in the evening. By interactive querying, it was found that most of the calls were directed at one 800 number, and that the number belonged to a radio station. By tuning in, it was discovered that the station was giving out free tickets for an upcoming concert. The winner was the tenth caller at the bottom of each hour.

Figure 8:
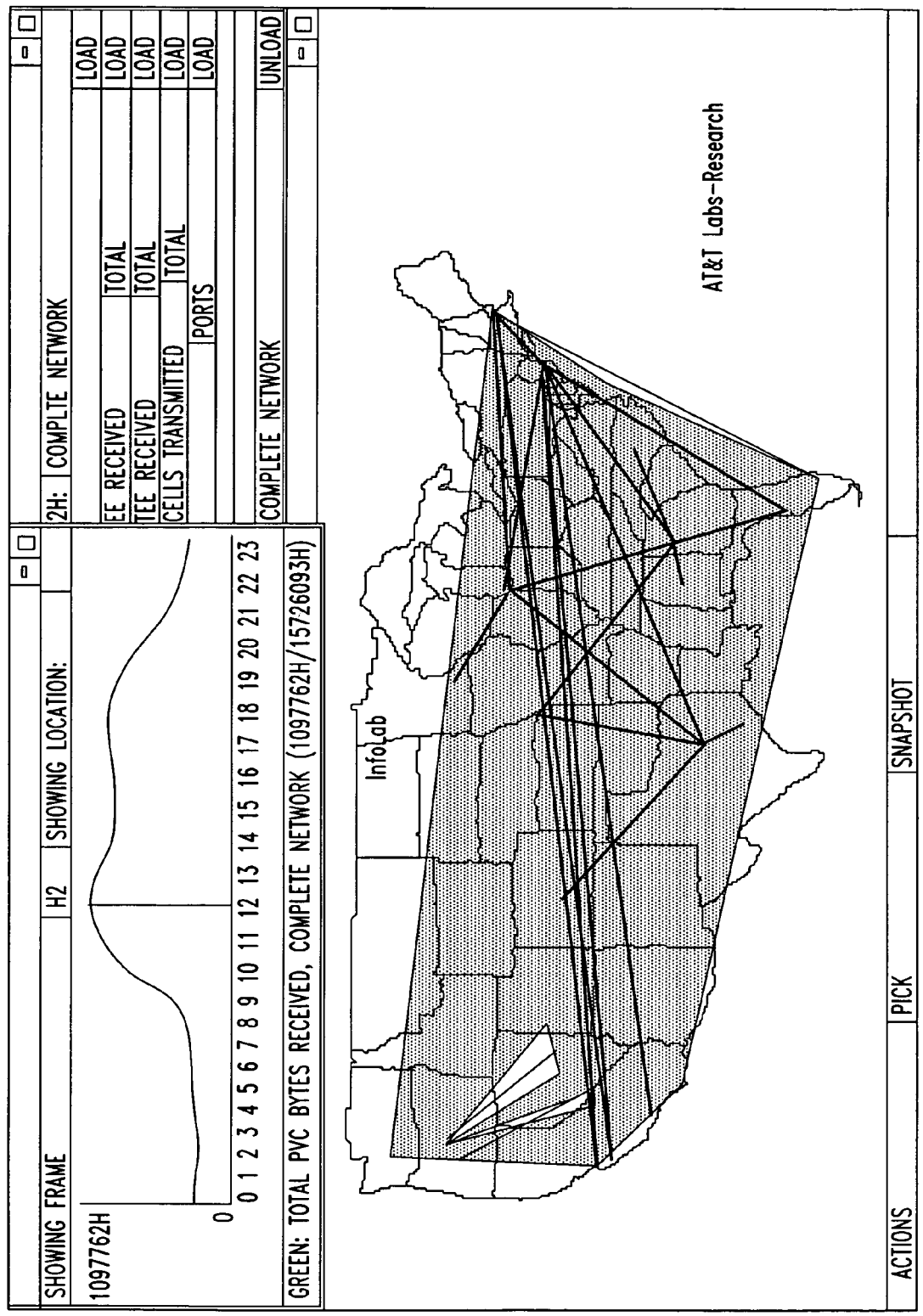
FIG. 8 is a screenshot illustrating a virtual network configuration constructed by joining network topology and customer configuration databases.

Another application concerns analysis of an Internet service. There is considerable motivation for understanding relationships between usage of multiple services, both from a single service provider, and between competitors. It is desirable for an Internet service provider to know how much coverage an Internet access service has. The coverage is measured by the number of the area code and exchanges (and ultimately households or customers) where connecting to the Internet is a local call (usually without per-minute charges). Two companies offered to provide what codes and exchanges were covered if given the locations of the modem pools of the Internet service provider. The two companies produced very different answers. To understand the differences, SWIFT-3D can be utilized: areas claimed to be covered in the answer of company A were colored blue, those claimed to be covered in the answer of Company B were colored green, where both companies agreed, the map was colored gray. There were widespread differences in many states, while a few states had good matches. In order to decide which company's answer was more correct, customer usage data could be superimposed on the map. In the generated visualizations (cf. FIG. 8), it was seen that there was a lot of usage in gray and blue areas, but very little usage in green (and almost none in black areas). Our conclusion was that the answer by company A was more correct. It further became clear that individual customers are very aware of local calling areas, and are not willing to use an ISP when the access would be too expensive. This information, which was discovered through the visualization techniques possible with the present invention, can be utilized to inform business decisions as to how to advertise and market to these customers.

Figure 9:
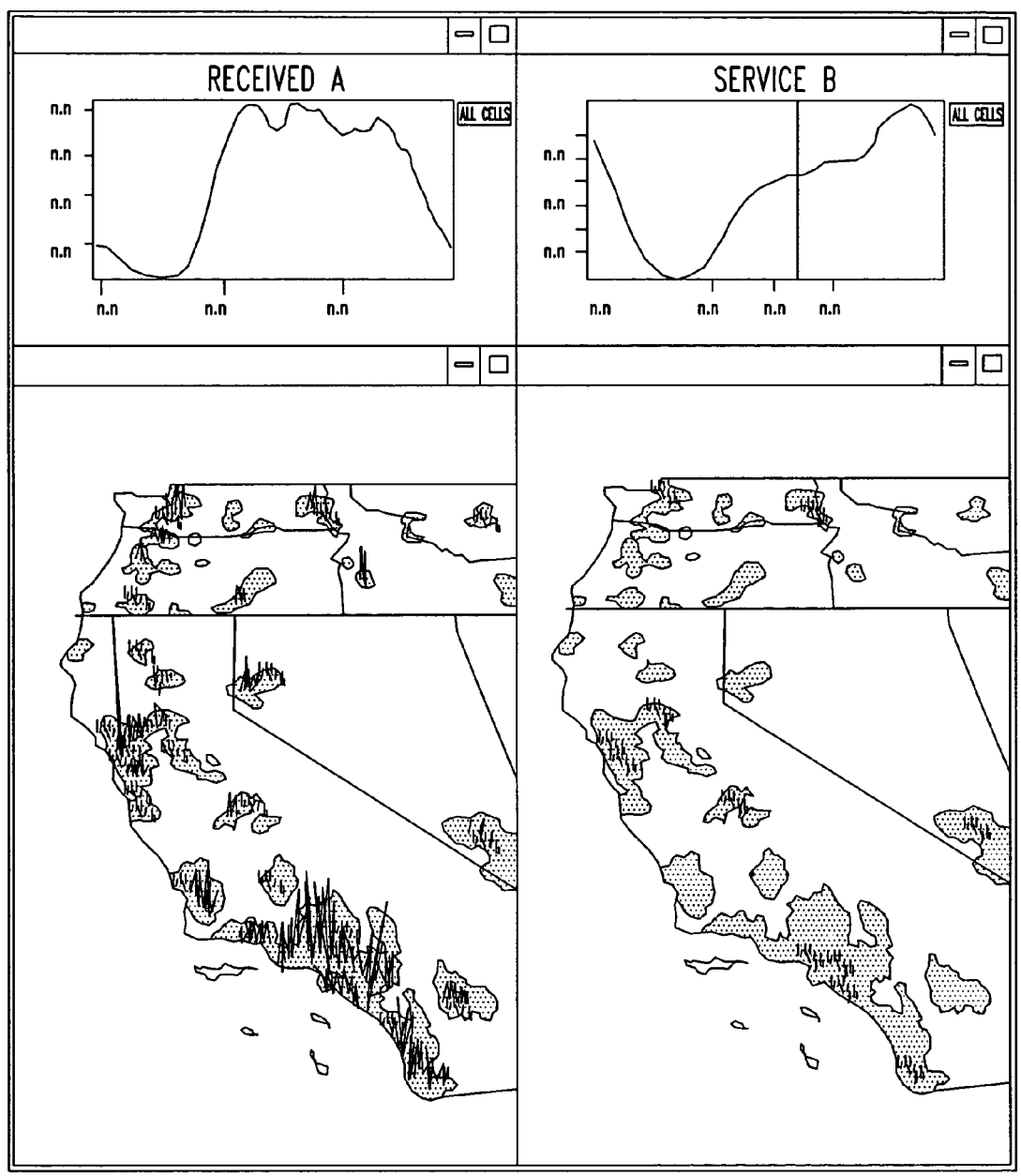
FIG. 9 is a screenshot illustrating market and service comparison between competitors.

A third application involves recognizing the characteristics of virtual private networks (VPNs) provisioned by customers on a large packet network, and their relationships to physical network facilities. FIG. 9 shows the peak volume of Permanent Virtual Circuit (PVC) traffic, by VPN, for the whole network in one 5-minute period. The display highlights the PVCs having the greatest load. FIG. 9 also illustrates the use of transparency with the 3D visualization allows for more information to be shown when dealing with very high volumes of data to be visualized. When displaying the thousands of PVCs and their usage, for the packet-switched network on a geographical map of the United States, levels of transparency allow for the higher volume PVCs to be more dominant to the human eye while the lesser volume PVCs are still visible but less dominant.

It should be noted that, even with the disparity among these application domains, it was not difficult to tailor SWIFT-3D to each. In large measure, this is due to the similarity of the visual models, and to the high-level descriptions used to specify much of the analysis and display. Probably the most difficult aspect in modifying SWIFT-3D for an application is construction of tools to massage the application's data into a format suitable for the system.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described a method for inferring network management metrics from based upon the disposition of customer transactions across a conventional voice toll-switched network. However, the principles of the present invention are readily extended to any large-scale data visualization problems. Such an extension could be readily implemented by one of ordinary skill in the art given the above disclosure.

What is claimed is:

1. A computer-implemented method executed in a visualization platform that includes a physical display coupled to the visualization platform, a data collector element for collecting real-time data from a network, a visualization interface element, and an aggregation element interposed between the data collector element and the visualization interface element, characterized by:

said data collection element includes a schema file that includes an entry for each of a plurality of data record types, each entry specifying a data record format of an ordered set of fixed-length fields, and the collection module is constructed to:

receive data records of said types, if the received data record is of a variety A, store the received data record in a storage medium with an association to said corresponding entry of said schema file, wherein the variety A data record is a record with an ordered fixed-length fields format that correspond to the entry of said schema file;

if the received data record is of a variety B, convert the received data record to an ordered fixed-length fields format that correspond to an entry of said schema file and store in said storage medium the converted data record with an association to said corresponding entry of said schema file, wherein the variety B data record is a record that does not have an ordered fixed-length fields format that correspond to an entry of said schema file; and said aggregation element includes processing modules that process said records (DDS tool), and processing modules that process aggregates of said records (AGGR tool), and said aggregation element processes streams that contains pluralities of said records in a pipeline manner, and said visualization interface element is constructed to display, on said display, information generated by one or more of said AGGR tool;

wherein the aggregation element also includes geometry modules that map data to display objects and coloring of said display objects, wherein the display objects are taken from a set that comprises points, lines, polygons, and triangles, each of said geometry modules having a standard input and a standard output, wherein the standard input is an input that accepts data that is sent to a geometry module, and the standard output is an output that transmits out of said geometry module processing results created by said geometry module.

2. The computer-implemented method of claim 1, wherein the collection element is constructed to receive either said real-time data records from said network, or data records from a disk storage medium, as specified by a user.

3. The computer-implemented method of claim 2, wherein said collection element is constructed to receive data records from said disk arrangement using a Direct-IO port of said disk storage medium.

4. The computer-implemented method of claim 1, wherein each of said DDS and AGGR tools has a standard input and a standard output, wherein a standard input is an input that accepts data that is sent to the tool, and a standard output is an output that transmits out processing results created by said tool, and said pipeline processing is executed by specifying that the standard output of one of said tools is pipelined to the standard input of one or more of said tools.

5. The computer-implemented method of claim 1, wherein said processing is executes a plurality of said processing modules concurrently on data that is obtained from a specified source through execution of a DDS tool, and said specified source is taken from a set that includes said disk storage medium and standard input, wherein standard input is input that accepts information that is sent to the DDS tool.

6. The computer-implemented method of claim 5, wherein the specified source is set via a parameter that is specified to an instantiation of said DDS tool.

7. The computer-implemented method of claim 1, wherein said geometry modules concurrently map a plurality of data sets, each of which results in a distinct display of the mapped data set on said physical display.

8. The computer-implemented method of claim 1, wherein said visualization interface element is further constructed to allow users that have access to the display provided by said physical display to alter data that is processed and displayed.

9. The computer-implemented method of claim 1, wherein said visualization interface element includes a module to focus that which is displayed on said physical display onto a chosen dataset, and a module for altering the dataset that is processed and displayed.

* * * * *